(12) United States Patent
Adil et al.

(10) Patent No.: US 9,804,291 B2
(45) Date of Patent: Oct. 31, 2017

(54) METHODS AND APPARATUS FOR DETERMINING FLUID PARAMETERS

(75) Inventors: Abdur Rahman Adil, Sindh (PK); Elena Borisova, Paris (FR); Tullio Moscato, Paris (FR)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 225 days.

(21) Appl. No.: 14/125,293

(22) PCT Filed: Jun. 13, 2012

(86) PCT No.: PCT/US2012/042153
§ 371 (c)(1),
(2), (4) Date: Dec. 10, 2013

(87) PCT Pub. No.: WO2012/174050
PCT Pub. Date: Dec. 20, 2012

(65) Prior Publication Data
US 2014/0102695 A1    Apr. 17, 2014

Related U.S. Application Data

(60) Provisional application No. 61/496,180, filed on Jun. 13, 2011.

(51) Int. Cl.
*E21B 47/06* (2012.01)
*E21B 47/07* (2012.01)
(Continued)

(52) U.S. Cl.
CPC ............. *G01V 9/005* (2013.01); *E21B 47/00* (2013.01); *E21B 47/065* (2013.01); *E21B 47/10* (2013.01); *E21B 47/1005* (2013.01); *E21B 49/08* (2013.01)

(58) Field of Classification Search
CPC .... E21B 47/06; E21B 47/065; E21B 47/1005; E21B 49/003; G01V 9/005
See application file for complete search history.

(56) References Cited

U.S. PATENT DOCUMENTS

| 4,547,080 A | 10/1985 | Dunn et al. |
| 4,852,790 A | 8/1989 | Karlinski |

(Continued)

FOREIGN PATENT DOCUMENTS

| EP | 1435430 A1 | 7/2004 |
| GB | 2395969 | 6/2004 |

(Continued)

OTHER PUBLICATIONS

International search report for the equivalent PCT patent application No. PCT/US2012/042147 issued on Aug. 31, 2012.

(Continued)

*Primary Examiner* — Cathleen Hutchins
(74) *Attorney, Agent, or Firm* — Michael L. Flynn; Matthias Abrell; Robin Nava

(57) ABSTRACT

Example methods and apparatus for determining fluid parameters are disclosed herein. An example method includes disposing a sensor in a first fluid flow passageway. The sensor has a heater and a temperature sensor. The example method further includes flowing a first fluid into the first fluid flow passageway via a second fluid flow passageway and determining a first fluid property value of the first fluid via the sensor when the first fluid is in the first fluid flow passageway. Based on the first fluid property value, a state of an operation is determined.

16 Claims, 11 Drawing Sheets

(51) Int. Cl.
  *G01V 9/00* (2006.01)
  *E21B 47/10* (2012.01)
  *E21B 49/08* (2006.01)
  *E21B 47/00* (2012.01)

(56) References Cited

U.S. PATENT DOCUMENTS

| | | | |
|---|---|---|---|
| 4,979,112 A | | 12/1990 | Ketcham |
| 5,415,037 A | | 5/1995 | Griston |
| 5,428,994 A | * | 7/1995 | Wenzel .................. G01F 1/684 73/204.22 |
| 5,551,287 A | | 9/1996 | Maute et al. |
| 5,610,331 A | | 3/1997 | Georgi |
| 5,890,538 A | | 4/1999 | Beirute et al. |
| 5,965,813 A | | 10/1999 | Wan et al. |
| 6,176,323 B1 | | 1/2001 | Weirich |
| 6,227,045 B1 | | 5/2001 | Morse et al. |
| 6,751,556 B2 | | 6/2004 | Schroeder et al. |
| 6,856,909 B2 | | 2/2005 | Banning-Geertsma |
| 6,889,544 B2 | | 5/2005 | Tanimoto et al. |
| 7,000,692 B2 | | 2/2006 | Hosie et al. |
| 7,003,405 B1 | | 2/2006 | Ho |
| 7,536,905 B2 | * | 5/2009 | Jalali .................. E21B 47/065 702/12 |
| 7,731,421 B2 | | 6/2010 | Hadley |
| 2002/0100316 A1 | | 8/2002 | James et al. |
| 2003/0051919 A1 | | 3/2003 | Moore et al. |
| 2004/0043501 A1 | * | 3/2004 | Means .................. E21B 23/03 436/164 |
| 2004/0104045 A1 | | 6/2004 | Larovere |
| 2004/0112596 A1 | | 6/2004 | Williams et al. |
| 2004/0252748 A1 | * | 12/2004 | Gleitman .................. E21B 47/06 374/130 |
| 2005/0263281 A1 | | 12/2005 | Lovell et al. |
| 2006/0010973 A1 | | 1/2006 | Brown |
| 2007/0158064 A1 | | 7/2007 | Pribnow et al. |
| 2007/0289744 A1 | | 12/2007 | Bingamon et al. |
| 2007/0295081 A1 | | 12/2007 | Orban et al. |
| 2008/0023196 A1 | | 1/2008 | Crawley et al. |
| 2008/0137711 A1 | | 6/2008 | Gleitman |
| 2008/0236836 A1 | * | 10/2008 | Weng .................. E21B 43/26 166/336 |
| 2008/0308272 A1 | * | 12/2008 | Thomeer .................. E21B 43/00 166/250.15 |
| 2009/0091320 A1 | | 4/2009 | Flaum et al. |
| 2009/0145601 A1 | | 6/2009 | Bailey |
| 2009/0151937 A1 | | 6/2009 | Goodwin et al. |
| 2010/0051264 A1 | | 3/2010 | Willauer |
| 2010/0073189 A1 | | 3/2010 | Mandal et al. |
| 2010/0228502 A1 | | 9/2010 | Atherton |
| 2010/0230105 A1 | | 9/2010 | Vaynshteyn |
| 2010/0294021 A1 | | 11/2010 | Makino et al. |
| 2011/0017468 A1 | | 1/2011 | Birch et al. |
| 2011/0192598 A1 | | 8/2011 | Roddy et al. |
| 2011/0315375 A1 | | 12/2011 | Moscato et al. |

FOREIGN PATENT DOCUMENTS

| | | |
|---|---|---|
| WO | 99/34198 | 7/1999 |
| WO | 2005/064117 | 7/2005 |

OTHER PUBLICATIONS

International search report for the equivalent PCT patent application No. PCT/US2012/042129 issued on Aug. 31, 2012.
International search report for the equivalent PCT patent application No. PCT/US2012/042135 issued on Aug. 31, 2012.
International Search Report and Written Opinion issued in PCT Patent Appl. No. PCT/US2012/042149 on Sep. 18, 2013; 11 pages.
International Search Report and Written Opinion issued in PCT Patent Appl. No. PCT/US2012/042153 on Sep. 4, 2012; 8 pages.
International Search Report and Written Opinion issued in PCT Patent Appl. No. PCT/US2012/042155 on Nov. 7, 2013; 14 pages.
International Search Report and Written Opinion issued in PCT Patent Appl. No. PCT/US2012/042132 on Oct. 31, 2013; 11 pages.
Office Action issued in European Patent Application No. 12800169.0 on Feb. 15, 2016; 4 pages.
Definition of "drill string" accessed on Nov. 16, 2016 via Schlumberger Oilfield Glossary, http://www.glossary.oilfiled.slb.com/Terms/d/dril_string_aspx; 1 page.
Definition of mud pump accessed on Nov. 22, 2016 via United States Department of Labor, Occupational Safety and Health Administration, https://www.osha.gov/SLTC/etools/oilandgas/index.html; 4 pages.
Definition of logging accessed on Nov. 22, 2016 via Schlumberger Oil Filed Glossary, http://www.glossary.oilfiled.slb.com/Terms/l/logging.aspx; 1 page.
Office Action issued in U.S. Appl. No. 14/125,296 on Nov. 29, 2016; 15 pages.
Office Action issued in U.S. Appl. No. 14/125,295 dated Jun. 21, 2017; 8 pages.
Office Action issued in U.S. Appl. No. 14/125,300 dated Jun. 16, 2017; 11 pages.
Office Action issued in U.S. Appl. No. 14/125,303 dated Apr. 20, 2017; 15 pages.

* cited by examiner

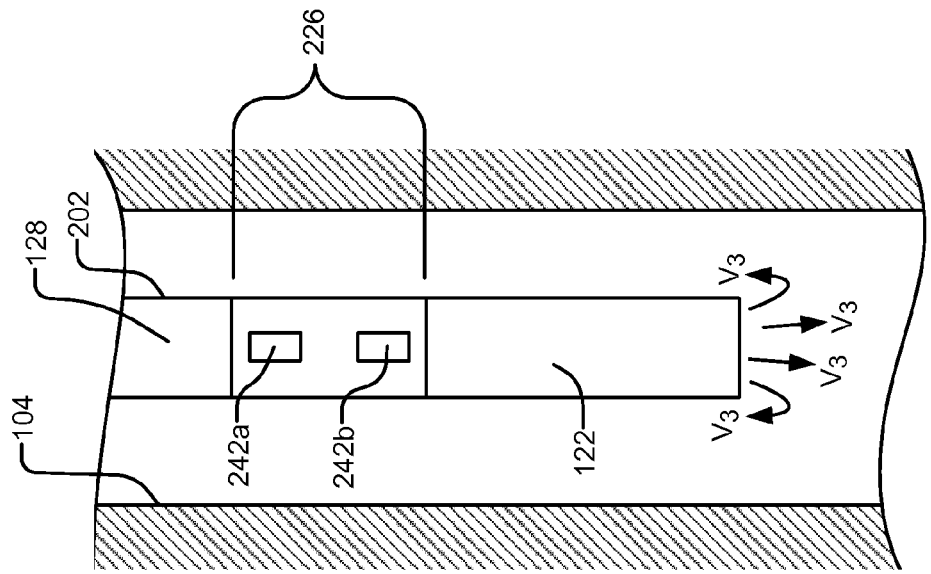
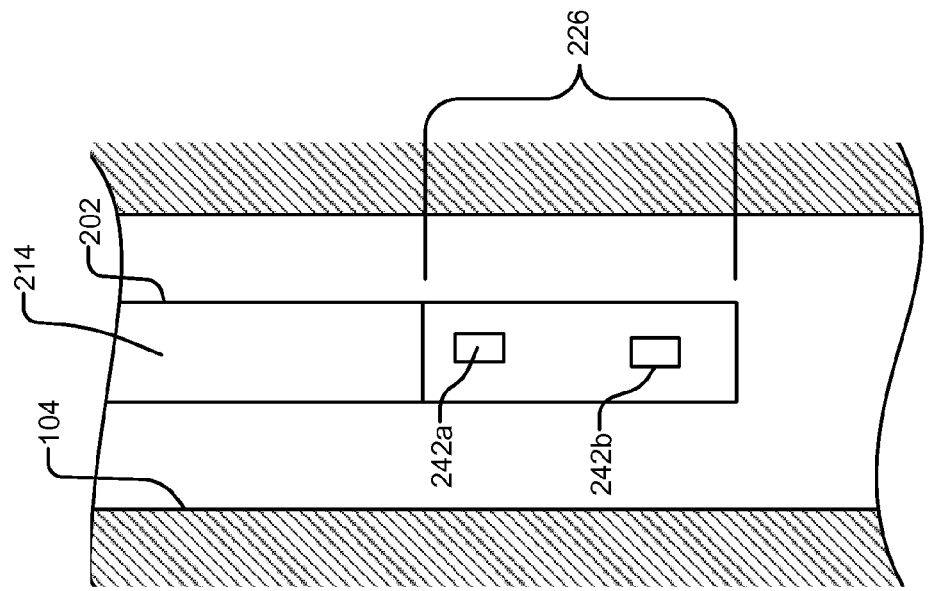

METHODS AND APPARATUS FOR DETERMINING FLUID PARAMETERS

RELATED APPLICATIONS

This patent claims the benefit of U.S. Provisional Patent Application Ser. No. 61/496,180, entitled "System and Method for Determining Downhole Fluid and Borehole Parameters," which was filed on Jun. 13, 2011, and is incorporated herein by reference in its entirety.

BACKGROUND

A wellbore may be drilled through a subterranean formation to extract hydrocarbons. A downhole tool may be disposed in the wellbore to perform an operation such as, for example, sampling formation fluids, drilling, logging, etc. In some instances, the downhole tool may be used to pump a fluid such as, for example, mud into the wellbore to perform the operation.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

An example method disclosed herein includes disposing a sensor in a first fluid flow passageway. The sensor has a heater and a temperature sensor. The example method further includes flowing a first fluid into the first fluid flow passageway via a second fluid flow passageway and determining a first fluid property value of the first fluid via the sensor when the first fluid is in the first fluid flow passageway. Based on the first fluid property value, a state of an operation is determined.

Another example method disclosed herein includes disposing a downhole tool in a wellbore. The downhole tool includes a first sensor and a second sensor. The first sensor has a first heater and a first temperature sensor, and the second sensor has a second heater and a second temperature sensor. The example method further includes flowing a fluid into the wellbore from inside the downhole tool and determining a first fluid property value of the fluid via the first sensor when the fluid is inside the downhole tool. The example method also includes determining a second fluid property value of the fluid via the second sensor when the fluid is in the wellbore outside of the downhole tool. Based on the first fluid property value and the second fluid property value, a state of an operation to be performed via the downhole tool is determined.

Another example method disclosed herein includes disposing a downhole tool in a wellbore. The downhole tool includes a sensor having a heater and a temperature sensor. The example method further includes determining a first fluid property value of a first fluid via the sensor. The first fluid is disposed in the wellbore adjacent the downhole tool. The example method also includes flowing a second fluid into the wellbore from inside the downhole tool and determining a second fluid property value of the first fluid via the sensor. Based on the first fluid property value and the second fluid property value, a state of an operation is determined.

BRIEF DESCRIPTION OF THE DRAWINGS

Embodiments of methods and apparatus for determining fluid parameters are described with reference to the following figures. The same numbers are used throughout the figures to reference like features and components.

FIG. 2D illustrates various components of another example device that can implement embodiments of the methods and apparatus for determining fluid parameters.

FIG. 2E illustrates various components of yet another example device that can implement embodiments of the methods and apparatus for determining fluid parameters.

DETAILED DESCRIPTION

Figure 1A:
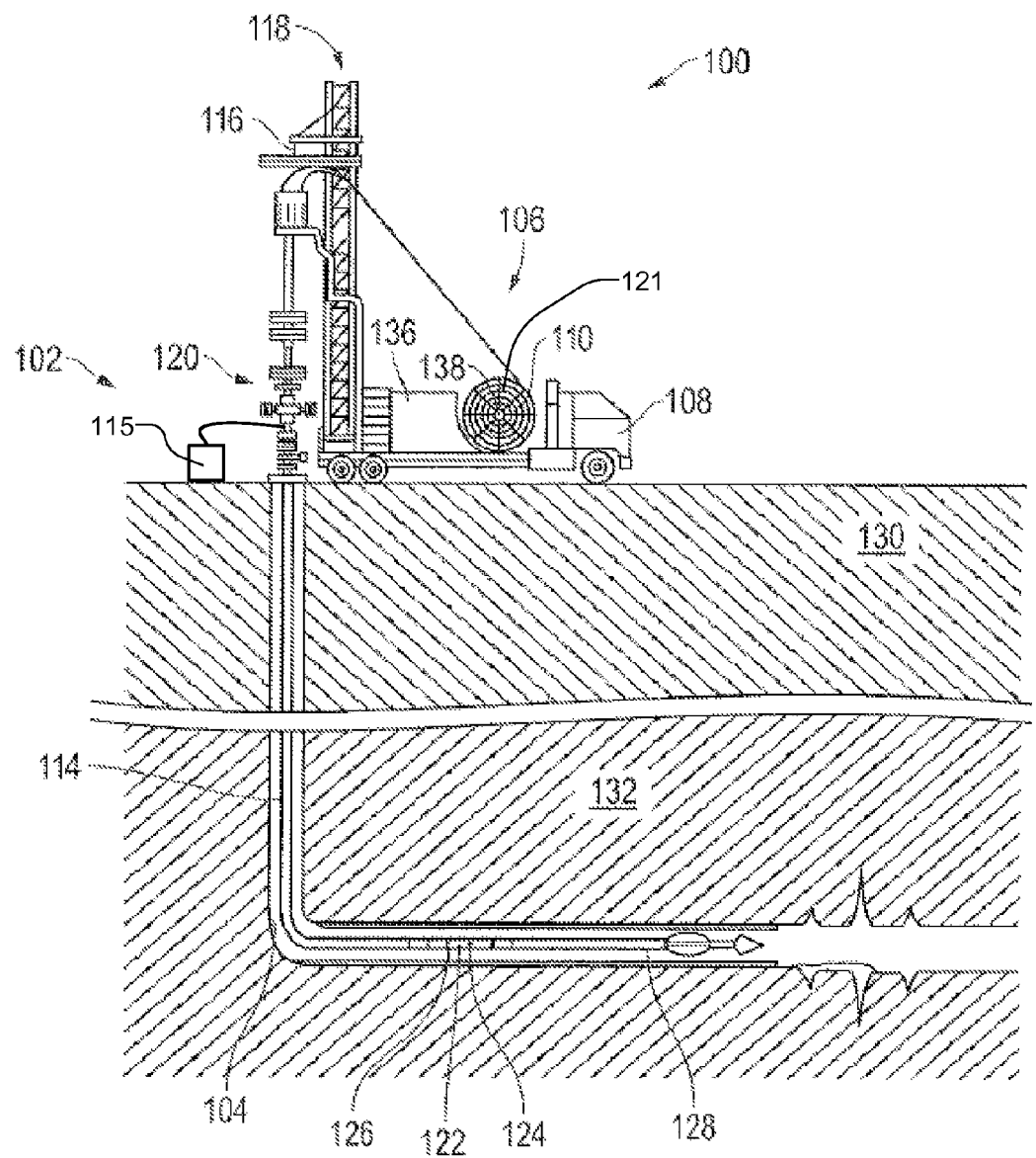
FIG. 1A illustrates an example system in which embodiments of methods and apparatus for determining fluid parameters can be implemented.

It is to be understood that the following disclosure provides many different embodiments or examples for implementing different features of various embodiments. Specific examples of components and arrangements are described below to simplify the present disclosure. These are, of course, merely examples and are not intended to be limiting.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features such that the first and second features may not be in direct contact.

Although some example fluid sensing systems disclosed herein are discussed as being positioned on treatment tools of a coiled tubing system, other examples are employed with and/or without treatment tools. For example, a fluid sensing element may be employed apart from the coiled tubing system. Thus, in some examples, the fluid sensing system may be deployed by a drill pipe, a drill string or any other suitable conveyance device. Other example methods and apparatus disclosed herein may be employed at the surface and/or at any other suitable location.

Example apparatus and methods disclosed herein may be used to determine fluid parameters. An example method disclosed herein may include disposing a downhole tool in a wellbore. In some examples, the downhole tool includes a first sensor having a heater and a temperature sensor. The first sensor may be disposed on an exterior surface of the downhole tool. In some examples, the downhole tool includes a second sensor disposed inside the downhole tool. The second sensor may include a heater and a temperature sensor. In some examples, the first sensor may be used to determine a first fluid property value (e.g., a thermal property value, a density, etc.) of a first fluid disposed in the wellbore adjacent the downhole tool. A second fluid may be flowed into the wellbore from inside the downhole tool, and a second fluid property value of the second fluid may be determined via the second sensor.

In some examples, the second fluid may cause a chemical reaction in the wellbore and/or carry particulates uphole. A third property value of the first fluid, which may include the second fluid, bubbles, foam, particles, etc., may be determined via the first sensor. In some such examples, the third fluid property value may be compared to at least one of the first fluid property value and the second fluid property value. Based on the first fluid property value, the second fluid property value, and/or the third fluid property value, a state of an operation (e.g., a chemical reaction operation, a particulate removal operation, etc.) may be determined.

FIG. 1A is a schematic depiction of a wellsite 100 with a coiled tubing system 102 deployed into a well 104. The coiled tubing system 102 includes surface delivery equipment 106, including a coiled tubing truck 108 with reel 110, positioned adjacent the well 104 at the wellsite 100. The coiled tubing system 102 also includes coiled tubing 114. In some examples, a pump 115 is used to pump a fluid into the well 104 via the coiled tubing. With the coiled tubing 114 run through a conventional gooseneck injector 116 supported by a mast 118 over the well 104, the coiled tubing 114 may be advanced into the well 104. That is, the coiled tubing 114 may be forced down through valving and pressure control equipment 120 and into the well 104. In the coiled tubing system 102 as shown, a treatment device 122 is provided for delivering fluids downhole during a treatment application. The treatment device 122 is deployable into the well 104 to carry fluids, such as an acidizing agent or other treatment fluid, and disperse the fluids through at least one injection port 124 of the treatment device 122.

The example treatment device 122 is optional and its use will depend on the various applications. The coiled tubing system 102 of FIG. 1A is depicted as having a fluid sensing system 126 positioned about the injection port 124 for determining parameters of fluids in the well 104. The fluid sensing system 126 is configured to determine fluid parameters, such as fluid direction and/or velocity. In other examples, other fluid parameters are determined.

In some examples, the coiled tubing system 102 includes a logging tool 128 for collecting downhole data. The logging tool 128 as shown is provided near a downhole end of the coiled tubing 114. The logging tool 128 acquires a variety of logging data from the well 104 and surrounding formation layers 130, 132 such as those depicted in FIG. 1A. The logging tool 128 is provided with a host of well profile generating equipment or implements configured for production logging to acquire well fluids and formation measurements from which an overall production profile may be developed. Other logging, data acquisition, monitoring, imaging and/or other devices and/or capabilities may be provided to acquire data relative to a variety of well characteristics. Information gathered may be acquired at the surface in a high speed manner, and, where appropriate, put to immediate real-time use (e.g. via a treatment application). Some examples do not employ the logging tool 128.

With reference still to FIG. 1A, the coiled tubing 114 with the treatment device 122, the fluid sensing system 126 and the logging tool 128 thereon is deployed downhole. As these components are deployed, treatment, sensing and/or logging applications may be directed by way of a control unit 136 at the surface. For example, the treatment device 122 may be activated to release fluid from the injection port 124; the fluid sensing system 126 may be activated to collect fluid measurements; and/or the logging tool 128 may be activated to log downhole data, as desired. The treatment device 122, the fluid sensing system 126 and the logging tool 128 are in communication with the control unit 136 via a communication link (FIGS. 1B-1D), which conveys signals (e.g., power, communication, control, etc.) therebetween. In some examples, the communication link is located in the logging tool 128 and/or any other suitable location. As described in greater detail below, the communication link may be a hardwire link or an optical link.

In the illustrated example, the control unit 136 is computerized equipment secured to the truck 108. However, the control unit 136 may be portable computerized equipment such as, for example, a smartphone, a laptop computer, etc. Additionally, powered controlling of the application may be hydraulic, pneumatic and/or electrical. In some examples, the control unit 136 controls the operation, even in circumstances where subsequent different application assemblies are deployed downhole. That is, subsequent mobilization of control equipment may not be included.

The control unit 136 may be configured to wirelessly communicate with a transceiver hub 138 of the coiled tubing reel 110. The receiver hub 138 is configured for communication onsite (surface and/or downhole) and/or offsite as desired. In some examples, the control unit 136 communicates with the sensing system 126 and/or logging tool 128 for conveying data therebetween. The control unit 136 may be provided with and/or coupled to databases, processors, and/or communicators for collecting, storing, analyzing, and/or processing data collected from the sensing system and/or logging tool.

In one example, the communication link between the treatment device 122, fluid sensing system 126 and/or logging tool 128 and the surface or control unit 136 may be implemented using a fiber optic or wired telemetry system. As such, the communication link/system may include tubing that provides and/or possesses a certain amount of stiffness in compression, similar to coiled tubing. In some such examples, a fiber optic tube is disposed inside coiled tubing. In some examples, a cross-sectional area of the fiber optic tube may be small relative to an inner area defined by the coiled tubing to limit a physical influence of the fiber optic tube on mechanical behavior of the coiled tubing during deployment and retrieval, thereby preventing "bird-nesting" or bundling within the coiled tubing. In some examples, optical fiber equipped coiled tubing is deployed into and retrieved from a wellbore at a greater speed than coiled tubing with wireline.

Figure 1B:
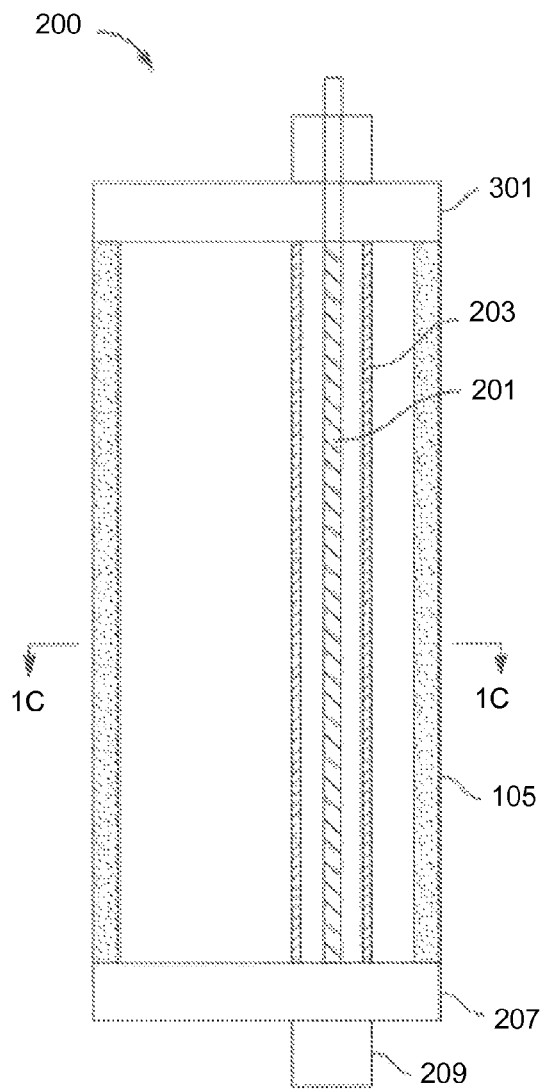
FIG. 1B illustrates various components of an example device that can implement embodiments of the methods and apparatus for determining fluid parameters.

FIG. 1B illustrates an example communication link 200 between the treatment device 122, the fluid sensing system 126, the logging tool 128, and/or the surface or control unit 136. In the illustrated example, the communication link 200 includes a tubular 105 within which a duct or tube 203 is disposed. In the illustrated example, an optical fiber 201 is disposed in the tube 203. In some examples, more than one optical fiber is disposed in the tube 203. In the illustrated example, a surface termination 301 and a downhole termination 207 are provided to couple the optical fiber 201 to one or more devices or sensors 209. In some examples, the optical fiber 201 is a multi-mode optical fiber. In other examples, the optical fiber 201 is a single-mode optical fiber. The devices or sensors 209 are, for example, gauges, valves, sampling devices, temperature sensors, pressure sensors, distributed temperature sensors, distributed pressure sensors, flow-control devices, flow rate measurement devices, oil/water/gas ratio measurement devices, scale detectors, actuators, locks, release mechanisms, equipment sensors (e.g., vibration sensors), sand detection sensors, water detection sensors, data recorders, viscosity sensors, density sensors, bubble point sensors, composition sensors, resistivity array devices and sensors, acoustic devices and sensors, other telemetry devices, near infrared sensors, gamma ray detectors, $H_2S$ detectors, $CO_2$ detectors, downhole memory units, downhole controllers, perforating devices, shape charges, firing heads, locators, and other devices.

Figure 1C:
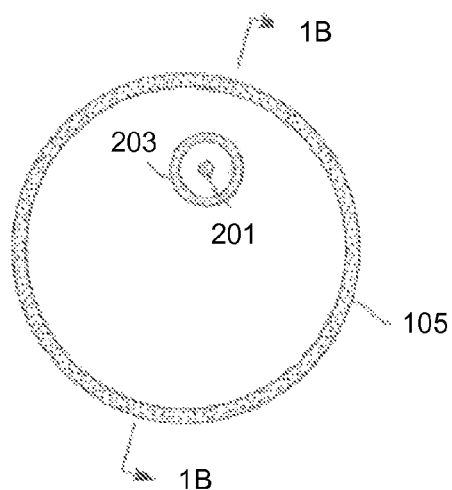
FIG. 1C illustrates various components of the example device of FIG. 1B that can implement embodiments of the example methods and apparatus for determining fluid parameters.

FIG. 1C is a cross-sectional view of the communication link 200 of FIG. 1B. Inside the tube 203, an inert gas such as nitrogen may be used to fill the space between the optical fiber or fibers 201 and the interior of the tube 203. In some examples, the fluid is pressurized to prevent the tube 203 from buckling. In some examples, a laser-welding technique is performed in an enclosed environment filled with an inert gas such as, for example, nitrogen to avoid exposing the optical fiber 201 to water or hydrogen during manufacturing. In some examples, the tube 203 is constructed by bending a metal strip around the optical fiber 201 and then welding that strip to form the tube 203. An example laser-welding technique is described in U.S. Pat. No. 4,852,790, which is hereby incorporated herein by reference in its entirety. In some examples, gel including palladium or tantalum is inserted into an end of the tube 203 to separate hydrogen ions from the optical fiber 201 during transportation of the communication link 200.

Materials suitable for use in the tube 203 provide stiffness to the tube 203, are resistant to fluids encountered in oilfield applications, and/or are rated to withstand the high temperature and high pressure conditions found in some wellbore environments. In some examples, the tube 203 is a metallic material and the tube 203 may include metal materials such as, for example, Inconel™, stainless steel, or Hasetloy™.

Figure 1D:
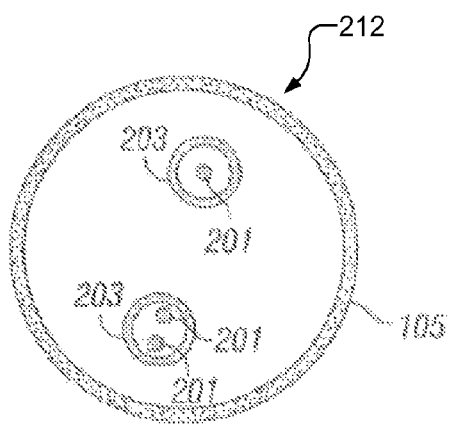
FIG. 1D illustrates various components of another example device that can implement embodiments of the methods and apparatus for determining fluid parameters.

In some examples, the tube 203 has an outer diameter of about 0.071 inches to about 0.125 inches. In some examples, the tube 203 is less than or equal to about 0.020 inches (0.508 mm) thick. The above-noted dimensions are merely examples and, thus, other dimensions may be used without departing from the scope of this disclosure FIG. 1D illustrates another example communication link 212. In the illustrated example, the communication link 212 includes a tubular 105 and a first tube 203 and a second tube 203. A first optical fiber 201 is disposed in the first tube. A second optical fiber 201 and a third optical fiber 201 are disposed in the second tube 203. In some example, the first optical fiber 201 is coupled to one of the devices 209, and the second optical fiber 201 and the third optical fiber 201 are coupled to one or more other ones of the devices 209. In some examples, more than one of the devices 209 may be coupled to a single optical fiber 201.

Figure 2B:
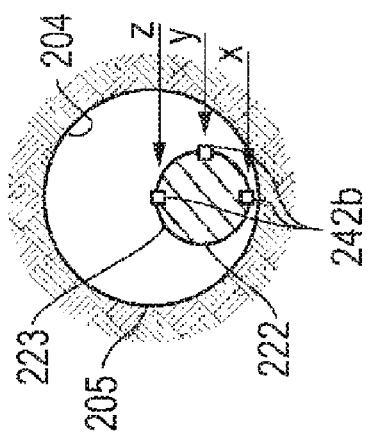
FIG. 2B illustrates various components of the example device of FIG. 2A that can implement embodiments of the methods and apparatus for determining fluid parameters.
Figure 2C:
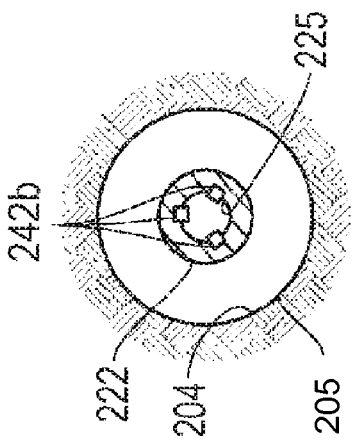
FIG. 2C illustrates various components of the example device of FIG. 2A that can implement embodiments of the methods and apparatus for determining fluid parameters.
Figure 2A:
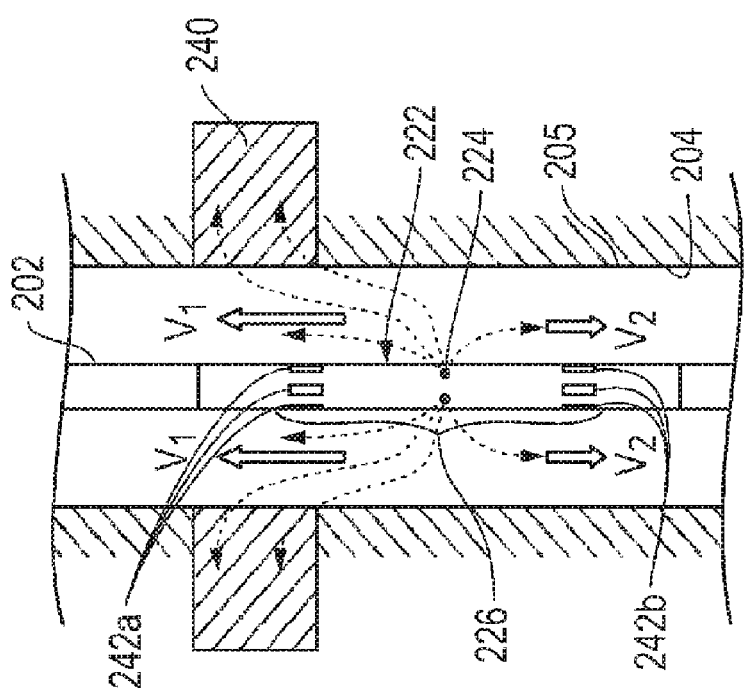
FIG. 2A illustrates various components of an example device that can implement embodiments of the methods and apparatus for determining fluid parameters.

FIGS. 2A-2C are schematic views of a portion of a coiled tubing system 202 with a treatment device 222 and fluid sensing system 226 on a coiled tubing 214 thereof, which may be used to implement the coiled tubing system 102, the treatment device 222 and/or the fluid sensing system 126 of FIG. 1A. FIG. 2A is a longitudinal view, partially in cross-section, depicting the fluid sensing system 226 positioned about the treatment device 222. As shown, the treatment device 222 has injection ports 224 for dispersing injection fluids into a well 204 as schematically depicted by the dashed arrows.

The injection fluid may be dispersed to treat a portion of a well 204, such as pay zone 240, to enhance production of fluid therefrom. As illustrated in FIG. 2A, stimulation fluid, such as acid, may be injected into the well 204 nearby the pay (or oil producing) zone 240 by means of the treatment tool 222. The acid is intended for the pay zone 240, but is shown positioned downhole therefrom. Precisely positioning the injection ports 224 against a zone of interest may be a challenging task due to uncertainties that may exist in target depth and/or tool position. The sensing system 226 around the injection port 224 may be tailored to measure a flow split upstream and downstream of the injection ports 224 in the well 204. Fluid movement may be used to indicate where the pay zone 240 is located relative to the injection port 224. Once known, the position of the treatment device 222 and the injection ports 224 may be positioned to affect treatment as desired.

As the fluid is released from the treatment device 222, the flow of the fluid is split with an upstream portion of the fluid moving upstream and a downstream portion of the injection fluid moving downstream. The upstream portion of the injection fluid travels upstream at a given velocity as indicated by the arrows labeled V1. The downstream portion of the injection fluid travels downstream at a given velocity as indicated by the arrows labeled V2. While the fluid is depicted as flowing in a specific direction, it will be appreciated that the flow of the fluid may vary with operating conditions.

While the example sensing system 226 illustrated in FIGS. 1 and 2A-2C is described in conjunction with the coiled tubing system 102 for determining fluid parameters, the sensing system 226 may also be used in other fluid flow applications such as, for example, detection of fluid cross-flow between zones, production logging (e.g., for single phase velocity, or in conjunction with Flow Scanner Imaging (FSI) complementary to a spinner in a low velocity range), downhole or surface testing in conjunction with use of a flowmeter (e.g., low speed Venturi based flowmeter applications), leakage detection (e.g., with dynamic seals), with other tools where flow velocity measurements is desired, among others. The sensing system 226 may be positioned on any surface, downhole and/or other movable equipment, such as a downhole tool, and/or in fixed equipment, such as a casing (not shown).

The sensing system 226 is depicted in FIG. 2A as having a plurality of sensor elements 242a,b positioned about the treatment device 222. In some examples, one or more sensor elements 242a,b are positioned about the coiled tubing system 102 to perform fluid and/or other downhole measurements. In some such examples, the sensor elements 242a,b are positioned about the injection port(s) 224 to measure fluid parameters. The fluid measured is the injection fluid dispersed from the treatment device 222, but may also include other fluids in the well (e.g., water, hydrocarbons, gases, etc.) that mix with the injection fluid as it is dispersed.

An upstream portion of the sensor elements 242a are depicted as being positioned on the treatment device 222 a distance upstream therefrom. A downstream portion of the sensor elements 242b are depicted as being positioned on the treatment device 222 a distance downstream therefrom. The upstream sensor elements 242a and/or the downstream sensor elements 242b may be arranged radially about the treatment apparatus 222. In the illustrated example of FIG. 2B, the sensor elements 242a,b are positioned at various radial locations x,y,z about the treatment apparatus 222. While a specific configuration for the sensor elements 242a,b is depicted in FIGS. 2A and 2B, it will be appreciated that one or more sensor elements may be positioned at various locations (longitudinally and/or radially) about the coiled tubing system 202 and/or well 204.

At least some of the sensor elements 242a,b are capable of sensing fluid parameters, such as fluid direction and velocity. In some examples, more than one of the sensor elements 242a,b may be capable of measuring the fluid parameters. In some examples, at least one of the sensor elements 242a for measuring fluid parameters is positioned upstream from the injection port 224, and at least one of the sensor elements 242b for measuring fluid parameters is positioned downstream from the injection port 224. In this configuration, the measurements of the upstream and the downstream fluid sensors 242a,b may be compared to determine fluid parameters, such as fluid direction and/or fluid velocity. The ratio between upper and lower velocities and fluid direction obtained from measurements of the upstream and downstream sensing elements 242a,b may be used to generate real-time monitoring of where the fluid is flowing during the treatment, as will be described further herein. Other fluid parameters may also optionally be measured with the fluid sensing system 226 and/or other sensors positioned about the well.

Comparison of multiple sensing elements 242a,b may be used to account for differences in measurements taken by the various sensing elements 242a,b. In some examples, multiple sensing elements 242a,b are used to provide sufficient redundancy and confidence in the measurement results. This redundancy may also reduce the severity of impact where one or more sensor elements 242a,b fails, such as in harsh downhole environments involving the use of acids. The multiple sensing elements 242a,b may also be used to generate fluid direction and/or velocity information. In such cases, at least one upstream sensor element 242a and at least one downstream sensor element 242b may be used. In some examples, additional sensor elements 242a,b are provided to enhance reliability of the values generated.

In some examples, it may be useful to consider the position of the sensing element 242a,b about the treatment tool 222. The number of arrays (or sets of sensing elements 242a,b), as well as the number of sensing elements 242a,b per array, may vary. As shown in FIG. 2A, the sensing elements 242a,b are positioned upstream and downstream to measure fluid as it passes upstream and downstream from the injection ports 224. In some examples, when using corresponding upstream and downstream sensing elements 242a,b, the corresponding sensing elements 242a,b, are positioned at equal distances from the injection port 224. In some examples, corresponding sensing elements 242a,b are identically matched. Matched sensing elements may be spaced at equal distances.

In the illustrated example, multiple sensing elements 242a,b are also positioned about the circumference of the tool at 90-degree intervals x, y, and z as shown in FIG. 2B. As shown in FIG. 2B, the sensing elements 242b are positioned at radial locations x, y and z about the treatment device 222. The sensing element 242b at position x is against a wall 205 of the well 204. The azimuthal arrangement of sensing elements 242a,b at positions x, y, and z provides redundancy in case one side of measurements is impeded.

An issue may appear when the tool body (e.g., the treatment tool 222) is eccentric (or not concentric) with the well 204 as shown in FIG. 2B. In the illustrated example, the sensing element $242b_x$ located closer to the wall 205 of the well 204 may read a lower flow value than the sensing elements $242b_y$, $242b_z$ positioned farther from the wall. In such cases, it may be desirable to ignore or remove measurements from potential obstructed sensing elements, such as the sensing element $242b_x$.

As shown in FIG. 2B, the sensing elements 242b are positioned on an outer surface 223 of the treatment tool 222. The sensing elements 242b may be flush with the outer surface 223, recessed below the outer surface 223 or extended a distance therefrom. In some examples, the sensing elements 242b are positioned such that each sensing element 242b contacts fluid for measurement thereof, but remains protected. To prevent damage in harsh downhole conditions, protrusion of the sensing elements 242b from the treatment tool may be reduced. As shown in FIG. 2C, the sensing elements 242b may also be positioned inside the treatment tool 222, for example, on an inner surface 225 thereof.

FIGS. 2D and 2E illustrate other portions of the coiled tubing system 202 including the fluid sensing system 226, which may be used to implement the example coiled tubing system 102 of FIG. 1A. In FIG. 2D, the example sensing system 226 is disposed at a lower end of the coiled tubing 114.

In FIG. 2E, the example sensing system 226 is disposed between the logging tool 128 and the treatment tool 122. In the illustrated example, the logging tool 128 is disposed above the sensing system 226 and the treatment tool 122 is disposed below the sensing system 226 in the orientation of FIG. 2E. In some examples, the fluid enters the well 104 as shown by arrows V3. In other examples, the sensing system 226 is disposed at one or more other locations on the coiled tubing 114.

Figure 3:
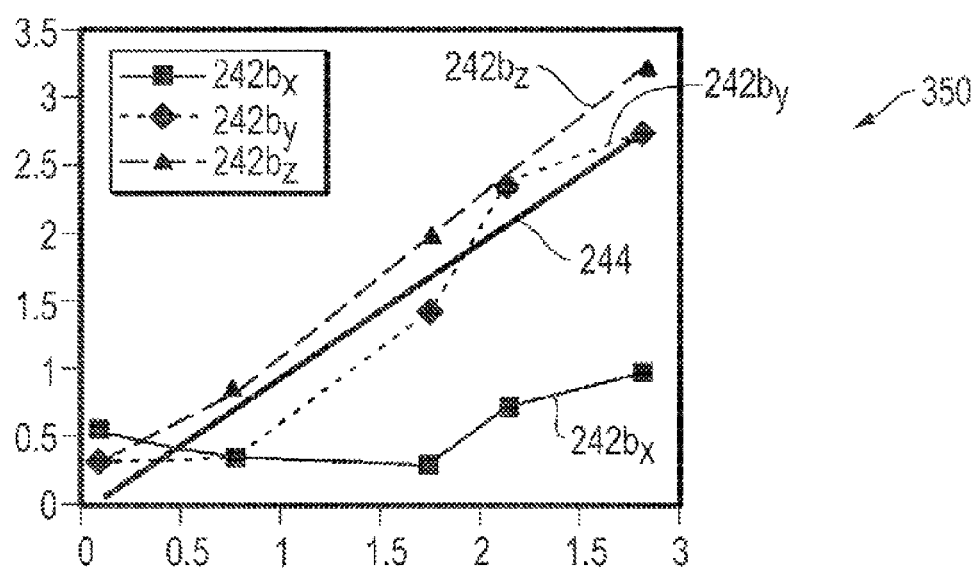
FIG. 3 is a graph depicting sensor measurements taken using the example device of FIG. 2B.

FIG. 3 is a graph 350 depicting sensor data taken from the example sensing elements 242b of FIG. 2B. The graph 350 plots flow velocity (x-axis) as a function of sensor output (y-axis) for sensing elements $242b_x$, $242b_y$, and $242b_z$ at positions x, y and z, respectively. As depicted by the graph 350, the flow velocity of the sensing elements $242b_y$ and $242b_z$ at positions y and z are different from the flow velocity of the sensing element $242b_x$ at position x. In other words, readings of the top sensing element $242b_z$ and the 90-degree sensing element $242b_y$ are substantially consistent in determining the flow velocity. However, the bottom sensing element $242b_x$ has a flow velocity that is lower.

The graph 350 indicates that the sensing element $242b_x$ at position x is pressed against the wall 205 of the well 204 and is unable to obtain proper readings. Thus, the measurements depicted by line $242b_x$ taken by sensing element 242b at position x may be disregarded. The measurements depicted as lines $242b_y$ and $242b_z$ taken by sensing elements 242b at positions y and z, respectively, may be combined using conventional analytical techniques (e.g., curve fitting, averaging, etc.) to generate an imposed flow 244. Thus, by placing several sensing elements 242a,b azimuthally around the circumference of a tool and detecting the lowest reading sensing element (e.g., $242b_x$), the azimuth of a flow obstruction may be determined. The sensing element located opposite to the lowest-reading sensing element (e.g., $242b_y$), or combinations of other sensing elements, may then be used to perform the flow measurement.

Figure 4A:
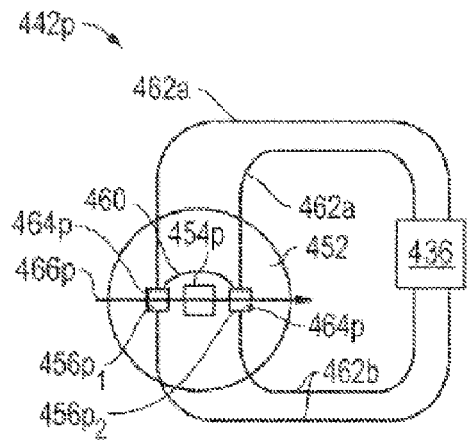
FIG. 4A illustrates various components of an example device that can implement embodiments of the methods and apparatus for determining fluid parameters.
Figure 4B:
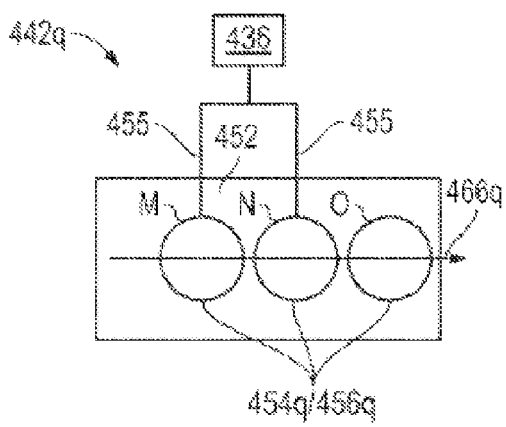
FIG. 4B illustrates various components of an example device that can implement embodiments of the methods and apparatus for determining fluid parameters.

FIGS. 4A and 4B are schematic views of sensing elements 442p and 442q usable as the sensing elements 242a,b of FIGS. 2A and 2B. Each of the sensing elements 442p,q has a heater 454p,q and a sensor 456p,q, respectively, positioned in a sensor base 452. In the illustrated example, the sensor 456p,q is a temperature sensor (or temperature sensor) capable of measuring fluid temperature.

In some examples, the sensor elements 442p,q are calorimetric type flow sensors (or flow meters) that have two sensing elements such as, for example, a sensor for velocity measurement (scalar sensor) and a sensor for directional measurement (vector sensor). The heater 454p,q and the temperature sensor 456p,q interact to operate as velocity (or scalar) and directional (or vector) sensors.

To determine fluid velocity, the sensing elements 442p,q act as calorimetric sensors. The heater 454p,q (or hot body) of each sensor elements 442p,q is placed in thermal contact with the fluid in the well 104. The rate of heat loss of the heater 454p,q to the fluid is a function of the fluid velocity as well as thermal properties. A heat dissipation rate of the heater 454p,q may be measured, and a flow velocity can be determined for a known fluid. The heater 454p,q generates heat (e.g., from electricity), and dissipates the heat to the fluid in contact. The rate of heat generation and the temperature may be readily measurable during operation.

The temperature sensor 456p,q may be used to monitor ambient temperature of the fluid, while the heater 454p,q measures its own temperature during heating. The difference between the temperature of the heater 454p,q and the ambient temperature of the fluid is defined as temperature excursion. The temperature excursion, $\Delta T$, may be written as follows:

$$\Delta T = T_h - T_a. \quad \text{Equation (1)}$$

In Equation 1, $T_a$ represents the ambient temperature of the fluid as measured by the temperature sensor; $T_h$ represents the temperature of the heater; and the temperature excursion is proportional to the heater power at a given flow condition. A thermal property between the heater and the fluid such as, for example, thermal conductance, $G_{th}$, may be calculated according to following expression:

$$G_{th} = \frac{P}{T_h - T_a} = \frac{P}{\Delta T}. \quad \text{Equation (2)}$$

In Equation 2, P represents the heater power in steady state. The inverse of this proportionality (or the thermal conductance) correlates the flow velocity $V_{flow}$ because $V_{flow}$ is a function of $G_{th}$. As provided by Equation 1, the thermal conductance is determined from three quantities: P (the heater power), $T_h$ (the temperature of the heater) and $T_a$ (the temperature of the fluid ambient). The quantities may be measured in steady state. Theoretically, the amount of power or temperature excursion used during measurement is immaterial to resultant thermal conductance. However, power and temperature excursion may affect accuracy because physical measurements have limits. In some cases, such as the configuration of FIG. 4B, a $\Delta T$ of a few degrees in Kelvin (K) may be considered appropriate.

In other examples, other thermal properties such as, for example, a normalized power dissipation are calculated to determine the flow velocity. The normalized power dissipation may be calculated according to the following expression:

$$\frac{P}{S(T_h - T_a)}. \quad \text{Equation (3)}$$

In Equation 3, the normalized power dissipation is calculated by dividing the power of the heater by the temperature excursion and an area of a heating surface of the sensor, S.

The measurements taken by the calorimetric sensing elements 454p,q may be used obtain the heater-fluid thermal conductance, the normalized dissipated power, and/or other thermal properties. A measurement technique may involve either constant excursion or constant power. For the constant excursion technique, power sent to the heater may be regulated by electronics (e.g., the control unit 136) such that the heater temperature may be maintained at a constant excursion above the fluid ambient temperature. In steady state, the power measured is monotonically related to the thermal conductance, the normalized power dissipation, and/or other thermal properties. For the constant power technique, the heater may be supplied with a constant and predetermined power, while the heater temperature $T_h$ varies and may be determined by flow velocity.

Figure 5A:
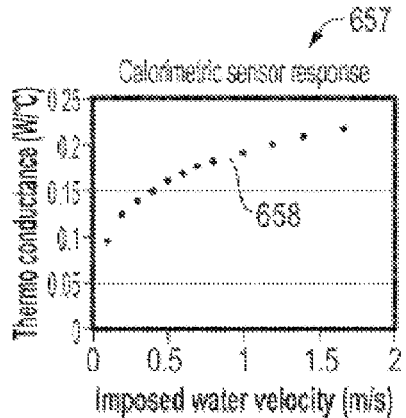
FIG. 5A is a graph illustrating sensor measurements.

FIG. 5A is a graph 657 depicting a flow response of a calorimetric sensor, such as the sensing elements 442a,b depicted in FIGS. 4A and 4B. The resulting thermal conductance versus flow curve 658 demonstrates that thermal conductance is non-linear relative to the flow velocity. However, the thermal conductance versus flow curve 658 is monotonic. Therefore, a correlation can be established to invert the measurement, and the flow velocity can be obtained as described in conjunction with Equations 1-3.

The measurement of flow velocity is a measurement of the thermal conductance, the normalized power dissipation, and/or other thermal properties between the heater 454p,q and the fluid. The measurement of thermal conductance and/or the normalized power dissipation may be determined with constant temperature excursion ($\Delta T$) or constant heater power. The constant temperature excursion may regulate temperature. The constant heater power may regulate power. Either measurement technique may involve the heater 454p,q and the temperature sensor 456p,q.

Referring back to FIGS. 4A and 4B, the sensing elements 442p,q may also act as scalar sensors to determine fluid direction. In the illustrated example, the sensing elements 442p,q are capable of acting as both calorimetric sensors for determining fluid velocity and vector sensors for measuring fluid direction. Calorimeter sensors may be unable to determine fluid direction. In such examples, the calorimetric sensors may respond to fluid velocity regardless of direction. Fluid direction may be acquired by a second measurement, such as by using vector sensors capable of fluid direction detection. Fluid direction may also be acquired by, for example, the sensing elements $442p,q$ of FIGS. 4A and 4B configured for measurement of both fluid velocity and direction. Physics that enables directional detection may also involve detection of asymmetry in temperature between upstream and downstream sensing elements (e.g., caused by heat from the heater $454p$ of the upstream sensing element), such as the upstream sensing elements $242a$ and the downstream sensing elements $242b$ of FIG. 2A.

FIGS. 4A and 4B depict configurations of the sensing element $442p,q$ capable of detecting both fluid flow rate and direction. FIG. 4A depicts a thermocouple (TC) sensing element $442p$. FIG. 4B depicts a dual sensing element $442q$. The base 452 for each sensing element $442p,q$ is sized for hosting the heater $454p,q$, the sensor $456p,q$ and/or other devices therein.

In some examples, the base 452 has a minimum thickness, or is recessed in the downhole tool, to prevent damage in the well 104. The sensor base 452 is positionable downhole, for example, on the treatment device 122, 222 and/or the coiled tubing 114, 214 (FIGS. 1, 2A, 2B). The base 452 may be round as shown in FIG. 4A or rectangular as shown in FIG. 4B. The base 452 may be made of epoxy, PEEK molding and/or any other material.

The heater $454p,q$ and the temperature sensor $456p,q$ may be positioned in close proximity in base 452, but are thermally isolated from each other. In the illustrated example, because the heater $454p,q$ creates a temperature gradient in the fluid, the temperature sensor $456p,q$ is provided with sufficient thermal isolation from the heater $454p,q$ to prevent the temperature sensor $456p,q$ from being disturbed by the heat flux of the heater $454p,q$ or thermally coupling with the heater $454p,q$, which may result in an erroneous measurement value. The temperature sensor $456p,q$ may optionally be positioned in a separate package spaced from the heater $454p,q$.

The TC sensing element $442p$ of FIG. 4A is depicted as having a pair of TC junctions (or sensors) $456p_{1,2}$ on either side of a heating pad (or heater) $454p$. The TC junctions $456p_{1,2}$ are linked by a metal wire 460. Each TC junction $456p_{1,2}$ has a TC pad with leads $462a,b$ extending therefrom. In some examples, the leads 462 are also wires operatively coupled to a controller 436 for operation therewith.

The TC junctions $456p$ positioned on either side of the heater $454p$ may be used to detect a temperature imbalance therebetween, and convert it into a TC voltage. A small voltage is present if the two TC junctions $456p_{1,2}$ are at a different temperatures. The TC junctions $456p_{1,2}$ are positioned very close to the heater $454p$ (one on each side) for maximum contrast of temperature. At zero flow, the heater $454p$ may heat up both TC junctions $456p_{1,2}$. However, the heating does not produce voltage.

Two metal pads $464p$ are depicted as supporting the TC junctions $456p_{1,2}$. The metal pads $464p$ may be provided to improve the thermal contact between the TC junctions $456p_{1,2}$ and the fluid. The metal pads $464p$ may be useful in cases where the TC junctions $456p_{1,2}$ are of a small size. The metal pads $464p$ and the TC junctions $456p_{1,2}$ may be held together by thermal adhesives such as silver epoxies or any other thermally conductive adhesives. The metal pads $464p$ are positioned in alignment with the heater $454p$, thereby defining a flowline $466p$ along the sensing element $442p$ as indicated by the arrow.

Figure 5B:
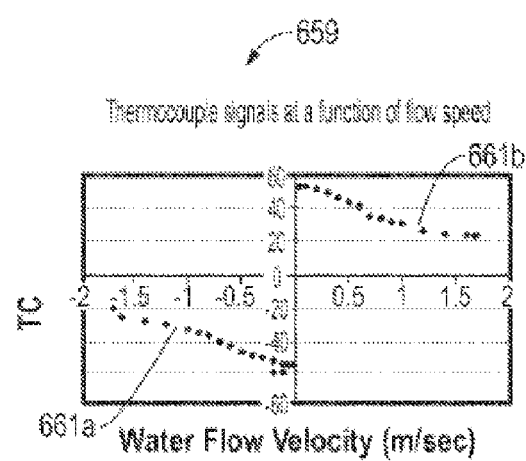
FIG. 5B is another graph illustrating sensor measurements.

TC voltage (y-axis) as a function of flow velocity (x-axis) is show in a graph 659 of FIG. 5B. The graph 659 exhibits an odd function of the flow velocity measured by the TC junctions $456p_{1,2}$. The magnitude of a maxima near zero flow tapers off gradually with increasing velocity. At zero crossing, the TC signal output undergoes an abrupt change in polarity from negative to positive as indicated by curves $661a,b$, respectively. This change in signal polarity may be used to detect the fluid direction as described in greater detail below.

Figure 6:
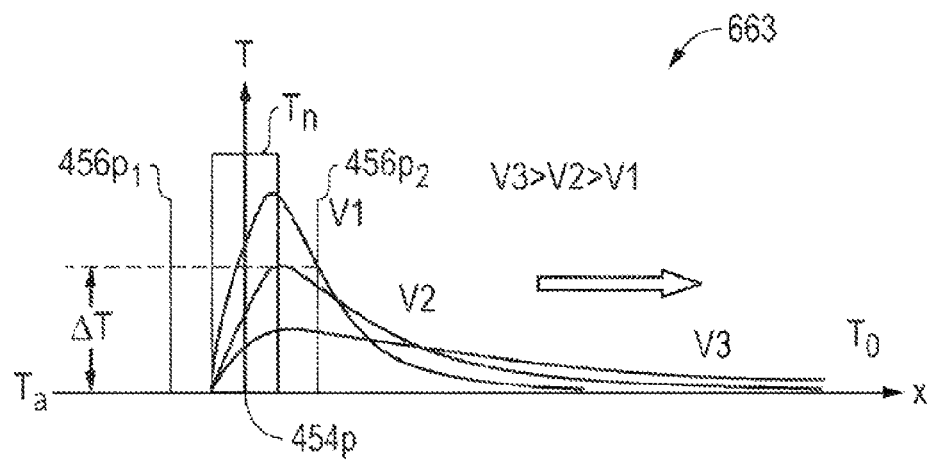
FIG. 6 is a graph of sensor measurements and fluid flow based on the sensor measurements.

The temperature profile along a flow stream of, for example, the sensing element $442p$ is shown schematically in FIG. 6. FIG. 6 is a graph 663 depicting temperature (y-axis) versus velocity (x-axis). As depicted by this graph, the heater $454p$ generates a constant heat $T_h$ measurable by the TC junction $456p_{1,2}$ on either side thereof. Heat from the heater $454p$ is carried downstream by the fluid forming a hot stream. The velocity V1, V2 and V3 are measured at, for example, different time intervals. Visibility of the thermal gradient may depend on the velocity. The thermal gradient between upstream and downstream is detectable with the sensor element $442p$. This creates a temperature contrast between the upstream and downstream TC junctions $456p_{1,2}$. This indicates that the flow is moving towards the TC junctions $456p_2$, thereby indicating fluid flow direction. By detecting asymmetry between the TC junctions $456p_{1,2}$, the fluid direction can be determined as indicated by the arrow.

The dual-element sensing element $442q$ of FIG. 4B is depicted as having two identical elements (sensors/heaters) $456q/454q$. The sensors/heaters $456q/454q$ are depicted as Element M and Element N in the sensing element $442q$. In some examples, the heater $454q$ and the sensor $456q$ (and, therefore, Elements M and N) are interchangeable in function and operation. In some such cases, the sensor $456q$ is capable of performing the functions of the heater and the heater $454q$ is capable of performing the functions of the sensor. The Elements M and N are operatively linked via links 455 to the controller 436 for operation therewith.

In some examples, a desired measurement may be operated in self-referenced mode in which a single Element M or N plays a dual role, both as heater and as temperature sensor. In some such cases, the heater and the temperature sensor may utilize a time multiplexing technique. In some examples, the role of the heater $454q$ and temperature sensor $456q$ may be reassigned at anytime. This measurement scheme may be used to provide flexibility in designing and/or operating the sensor element $442q$, which may be tailored to a particular application.

An asymmetry of temperature between the identical Elements M and N is detectable by the dual-element sensor $442q$. The two identical Elements M and N are positioned along a line of flow of the fluid as indicated by the arrow. The Elements M and N may be positioned in close proximity, for example, within the same base (or package) 452.

Measurement by the sensor element of FIG. 4B may be achieved using various methods. A first method involves measuring the heater power in flow using Element M as the heater and Element N as the temperature sensor. After a stable reading is attained, the roles of Elements M and N interchange and the measurement is repeated. Comparing the power of the two measurements, fluid direction can be ascertained. The heater that consumes more power is located upstream, provided that the flow does not vary in the meantime. A second method that may be used involves measuring by heating both elements M and N simultaneously with the same amount of power. The measurements of each element may be compared. Whichever element reveals a higher temperature is downstream in the direction of the fluid flow. A third method that may be used involves watching the temperature of Element M while switching on and off Element N at a certain power level. If an alteration of temperature is noticed, Element N may be assumed to be upstream of Element M. No change may suggest otherwise.

With the first two methods, where quantities are compared across Elements M and N, a good match of characteristics of the two elements M, N reduces potential errors. The match of elements may be achieved by calibration and normalization. The third method, on the other hand, may be used without as good of a match. Dual-element sensors are usable, for example, for bi-directional flow.

When the temperature sensor $456p,q$ and the heater $454p,q$ of FIGS. 4A and 4B reside in the same package (for instance, due to space constraint), the temperature sensor $456p,q$ is positioned upstream of the heater $454p,q$ (or element M is upstream of Element N). If flow goes in both directions, the temperature sensor $456p,q$ and heater $454p,q$ (or Elements M and N) may be positioned in a side-by-side (or flowline) configuration in line with the flow of the fluid as shown in the sensing elements $442p,q$ of FIGS. 4A and 4B.

While FIG. 4A depicts a single heater $454p$ with a pair of TC junctions $456p$ and FIG. 4B depicts a single heater $454p$ with a single temperature sensor $456q$, other examples employ multiple heaters $454p,q$ and/or sensors $456p,q$. Additional sensors and/or other devices may be incorporated into the sensing elements $442p,q$ and/or used in combination therewith. In sensor systems including multiple heaters $454p,q$, one temperature sensor $456p,q$ can serve multiple heaters $454p,q$. Some multi-elements sensors have more than two elements (e.g., M, N, P, D . . . ). As shown in FIG. 4B, a third element O may be provided. In another method of measurement, the three or more elements (e.g., M, N, O) may be used to detect fluid direction by heating a middle element and comparing the temperature between upstream and downstream elements thereabout.

As shown, the sensing elements $442p,q$ of FIGS. 4A and 4B (and/or the sensors, heaters, elements and/or other components used therein and/or therewith) are operatively coupled to the controller 436 for providing power, collecting data, controlling and/or otherwise operating the sensing element $442p,q$. The controller 436 may be, for example, the logging tool 128, the control unit 136 and/or other electronics capable of providing power, collecting data, controlling and/or otherwise operating the temperature sensors $456p,q$, heater $456p,q$ and/or other elements of the sensing elements $442p,q$. The power sources may be batteries, power supplies and/or other devices internal to and/or external to the sensing elements. In some cases, other devices such as the logging tool 128 of FIG. 1A may provide power thereto. Such electronic devices may be internal and/or external to the sensing elements. Communication devices may be provided to wire and/or wirelessly coupled the sensing elements to downhole and/or surface communication devices for communication therewith. In some cases, communication devices, such as transceivers may be provided in the sensing elements. In other cases, the sensing elements may be linked to the logging tool 128 (FIG. 1A) or other devices for communication as desired.

The sensing elements are also operatively coupled to and/or in communication with databases, processors, analyzers, and/or other electronic devices for manipulating the data collected thereby. The power, electronic and/or communication devices may be used to manipulate data from the sensing elements, as well as other sources. The analyzed data may be used to make decisions concerning the wellsite and operation thereof. In some cases, the data may be used to control the well operation. Some such control may be done automatically and/or manually as desired.

Figure 7:
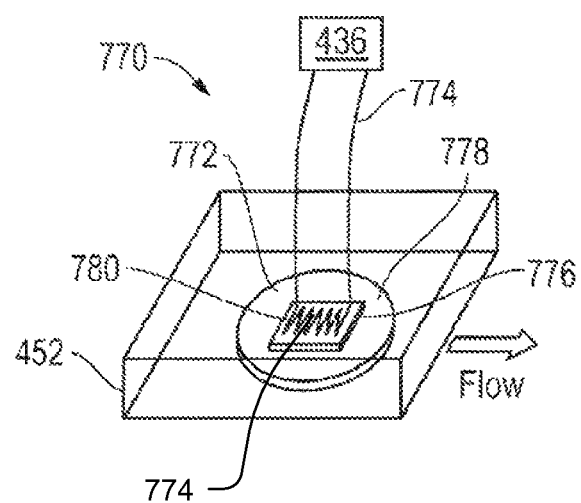
FIG. 7 illustrates various components of an example device that can implement embodiments of the methods and apparatus for determining fluid parameters.

While elements of the heater and the temperature sensor may be physically identical, the sensor can have a variety of types, forms and/or shapes. FIG. 7 depicts the sensor 770 usable as an element of the sensor elements $454p,q$ of FIGS. 4A and/or 4B. FIG. 7 depicts the sensor 770 usable as the heater $454q$ and/or the temperature sensor $456q$, as elements M, N and/or O, or in combination therewith. A shown, the sensor 770 is positionable in the base 452. The sensor 770 may be operatively coupled to the controller 436 via wires 774 for operation therewith in the same manner as previously described for the sensor elements $442p,q$.

The example sensor 770 of FIG. 7 is an RTD type sensor with a resistance that varies with temperature. In some examples, the sensor 770 is used for temperature sensing purposes. However, the sensor 770 may generate heat when current passes through the sensor 770. Thus, the example sensor 770 can be used both as a heater and a temperature sensor (e.g., $454p,q$ and $456p,q$ of FIG. 4B).

A thin-film type RTD capable of use as both a heater and temperature sensor may be used so that it can interchangeably operate as the Element M, N and/or O of FIG. 4B. As shown in FIG. 7, the sensor 770 positioned in the base 452 has a front surface (or contact surface) 772 positionable adjacent the fluid for taking measurements therefrom. In some examples, the sensor 770 employs platinum in the form of either wire or thin film (or resistor) 774 deposited on a heat-conductive substrate 776, such as sapphire or ceramic. The wire 774 is positioned in the film 776 and extends therefrom for operative linkage with the controller 436. The heat-conductive substrate 776 may be adhered or bonded to a thin pad 778 (made of, for example, Inconel or ceramic substrate) by a thermally conductive adhesive 780, such as silver epoxy, or by brazing. In some examples, such bonding provides low thermal resistance.

In the illustrated example, the sensor 770 is wrapped in protective packaging, but they may differ by thermal mass and, hence, response time. The shape of the pad 778 may be square, circular or any other shape capable of supporting the RTD in the base 452. In some examples, the pad 778 has a dimension of about 10 mm (or more or less), and a thickness sufficient for mechanical viability. The thickness and material selected may determine the performance of heater-fluid thermal contact.

The example sensor 770 may be configured with a large surface area for contact with the fluid and/or large thermal mass for passage of heat therethrough. A larger thermal mass may result in a relatively slower measurement response. However, the thermal mass may also assist in reducing (e.g., averaging out) spurious variations in readings caused by turbulence. Sensor electronics may also be provided to reduce spurious variations.

The sensor 770 and/or the sensing element $442q$ may be configured in a surface (or non-intrusive) form with a low profile (or thickness) as shown in FIGS. 7 and 4B. The sensor 770 and/or the sensing element $442q$ may be positionable downhole via a downhole tool (e.g., coiled tubing system 102 of FIG. 1A) extending a small distance (if any) therefrom. This low profile or non-intrusive surface form may be provided to reduce the disturbance to the fluid flowing across the sensor, while still allowing for measurement of the fluid. Moreover, the low profile surface form may also be configured to limit the amount of protrusion from the downhole the tool and, therefore, potential damage thereto.

Figure 8:
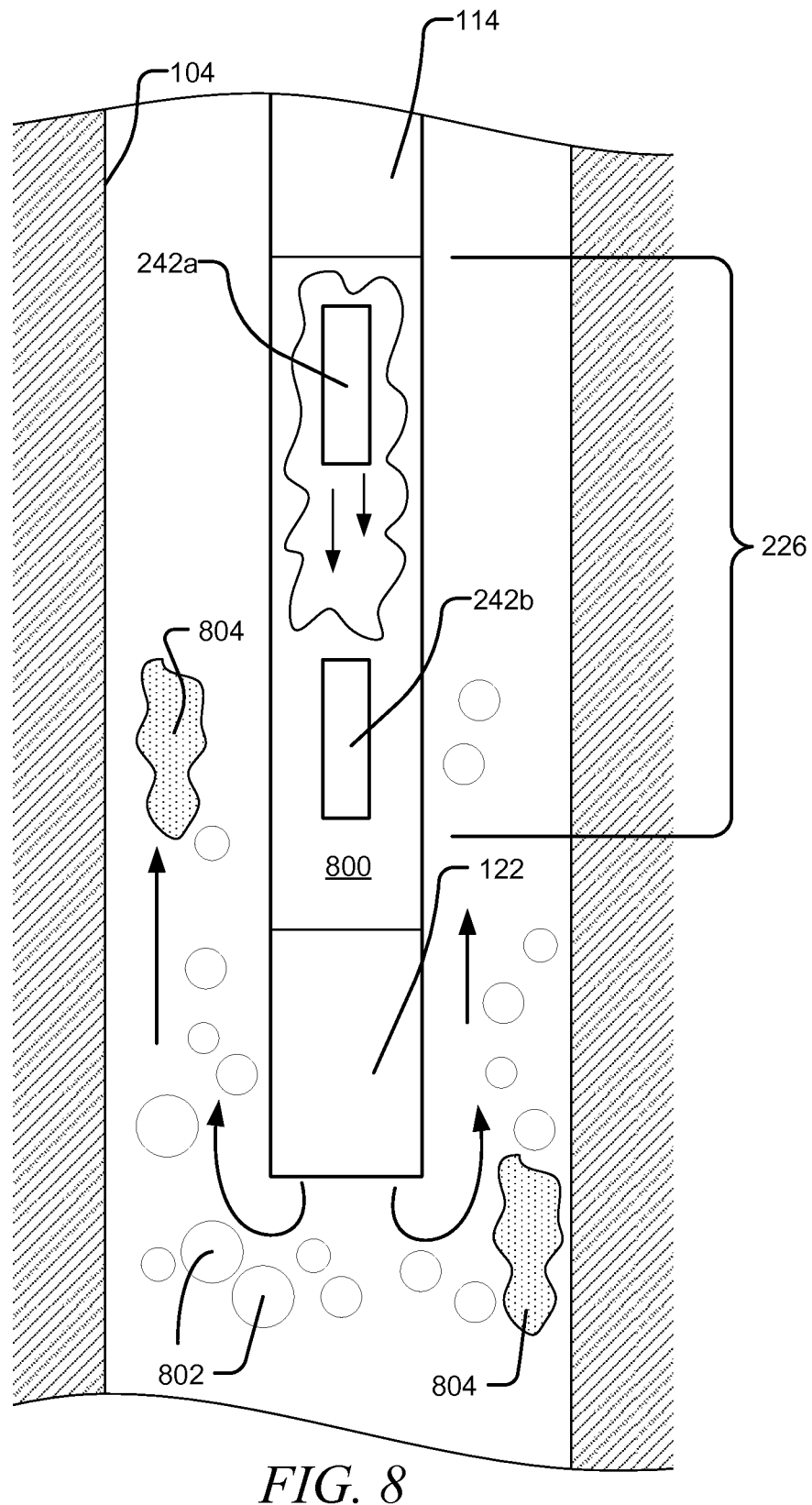
FIG. 8 illustrates various components of an example device that can implement embodiments of the methods and apparatus for determining fluid parameters.

FIG. 8 illustrates a portion of the example coiled tubing system 102 of FIG. 1A, which may be used to perform an operation such as, for example, a chemical reaction. In the illustrated example, the sensing system 226 includes one or more of the sensing elements 242a disposed inside the coiled tubing 114 and/or one or more of the sensing elements 242b disposed on an outer surface 800 of the coiled tubing 114. The example sensing system 226 and treatment device 122 are immersed in a first fluid, which is disposed in the well 104 adjacent the coiled tubing 114. In the illustrated example, the treatment device 122 flows (e.g., pumps) a second fluid (e.g., an acidizing agent, a chemical mixture, and/or any other suitable fluid) from the inside of the coiled tubing 114 into the well 104 to cause a chemical reaction with the first fluid. As a result, the chemical reaction occurs and the first fluid and/or the second fluid form bubbles 802 and/or foam 804. In some examples, the bubbles 802 and/or the foam 804 have different fluid properties than liquid portions of the first fluid and/or the second fluid. For example, the bubbles 802 and/or the foam 804 may have a different thermal conductivity than the liquid portions of first fluid and/or the second fluid. In some examples, a density of the bubbles 802 and/or the foam 804 is different than a density of the liquid portions of first fluid and/or the second fluid.

Before the second fluid exits the treatment device 122 and mixes and/or reacts with the first fluid in the well 104, the sensing element 242b may be used to determine a first fluid property value of the first fluid. Then, as the second fluid flows inside the coiled tubing 114, the example sensing element 242a may be used to determine a second thermal property value of the second fluid. After the second fluid exits the treatment device 122, the bubbles 802 and/or the foam 804 may form in the well 104, and the example sensing element 242b may be used to determine a third fluid property value of the first fluid, which may include the second fluid, the bubbles 802 and/or the foam 804. In some examples, a characteristic (e.g., size, thermal properties, density, etc.) of the foam 804 and/or one of the bubbles 802 may be determined via the sensing element 242b. Based on the first fluid property value, the second fluid property value, and/or the third fluid property value, a state of the chemical reaction may be determined. For example, if and/or when the chemical reaction occurred and/or ended may be determined, a duration of the chemical reaction may be determined, if a number of the bubbles 802 and/or an amount of the foam 804 is increasing or decreasing may be determined, etc.

Figure 9:
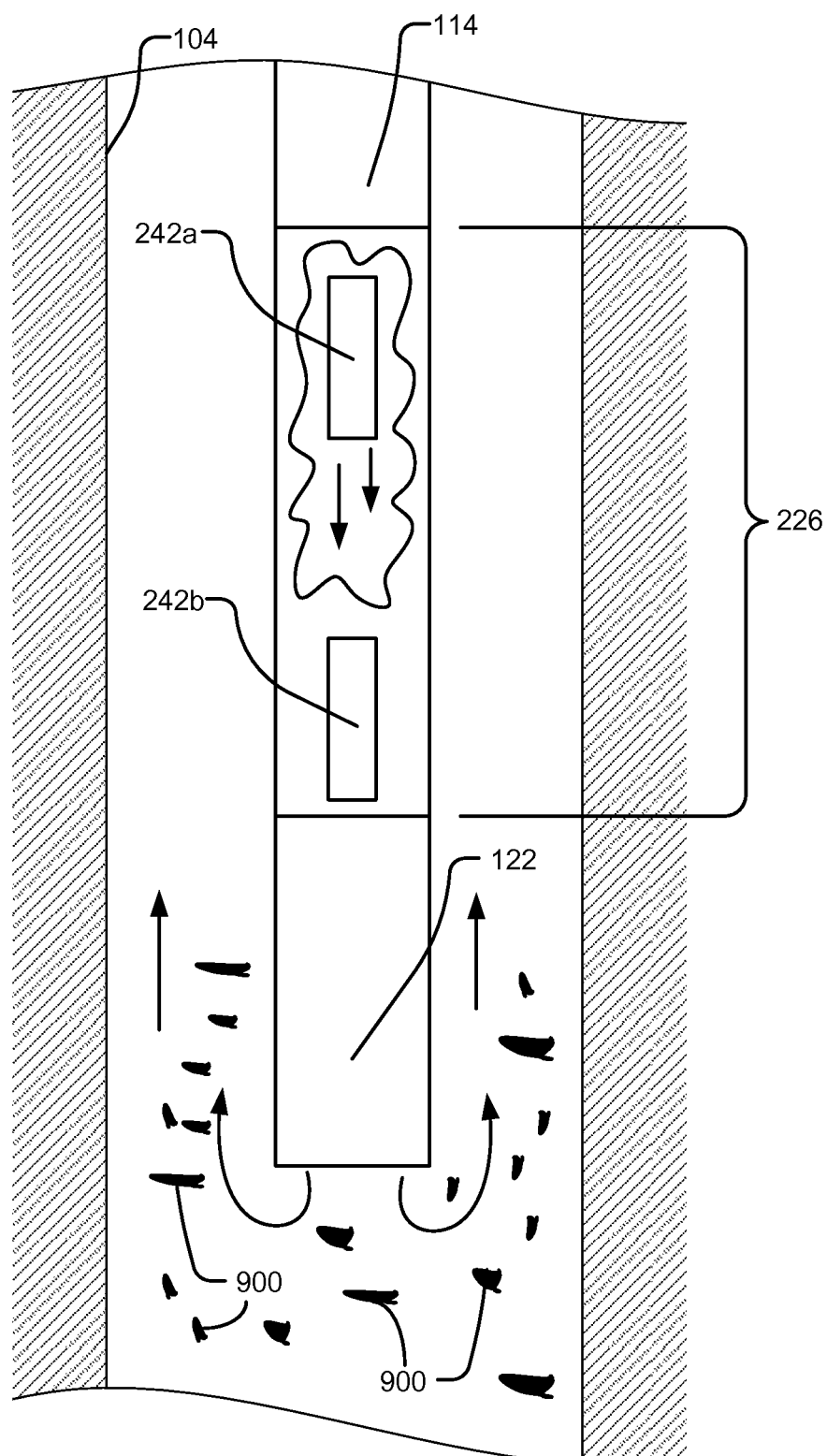
FIG. 9 illustrates various components of the example device of FIG. 8 that can implement embodiments of the methods and apparatus for determining fluid parameters.

FIG. 9 illustrates the example tubing system 102 being operated to remove particulates 900 from an end of the well 104. In the illustrated example, mud is flowing from inside the coiled tubing 114 into the well 104 to remove particulates 900 (e.g., sediment, cuttings, etc.) from the well 104. In other examples, any other suitable fluid may be flowed (e.g., pumped) from the coiled tubing 114 into the well 104. In the illustrated example, the mud flows downward in the orientation of FIG. 9 out of the coiled tubing 114 to mix with and/or carry the particulates 900 from a bottom of the well 104 toward a surface of Earth. When the particulates 900 mix with and/or are carried by the mud, a fluid property of the mud may be affected. For example, a density, a thermal conductivity, and/or values of other fluid properties of the mud may increase or decrease. Thus, the example sensing elements 242a and 242b may be used to determine a state of an operation to remove the particulates 900 based on the fluid property of the mud.

For example, determining that a first fluid property value of the mud inside the coiled tubing 114 is different than a second fluid property value of the mud in the well 104 may indicate that the mud is carrying the particulates 900 toward the surface. In some examples, if it is determined that the first fluid property value is about the same as the second fluid property value, the particulates 900 may be substantially removed from the bottom of the well 104. The above-noted state and operations are merely examples and, thus, the example methods and apparatus disclosed herein may be used in conjunction with other states and other operations.

Figure 10:
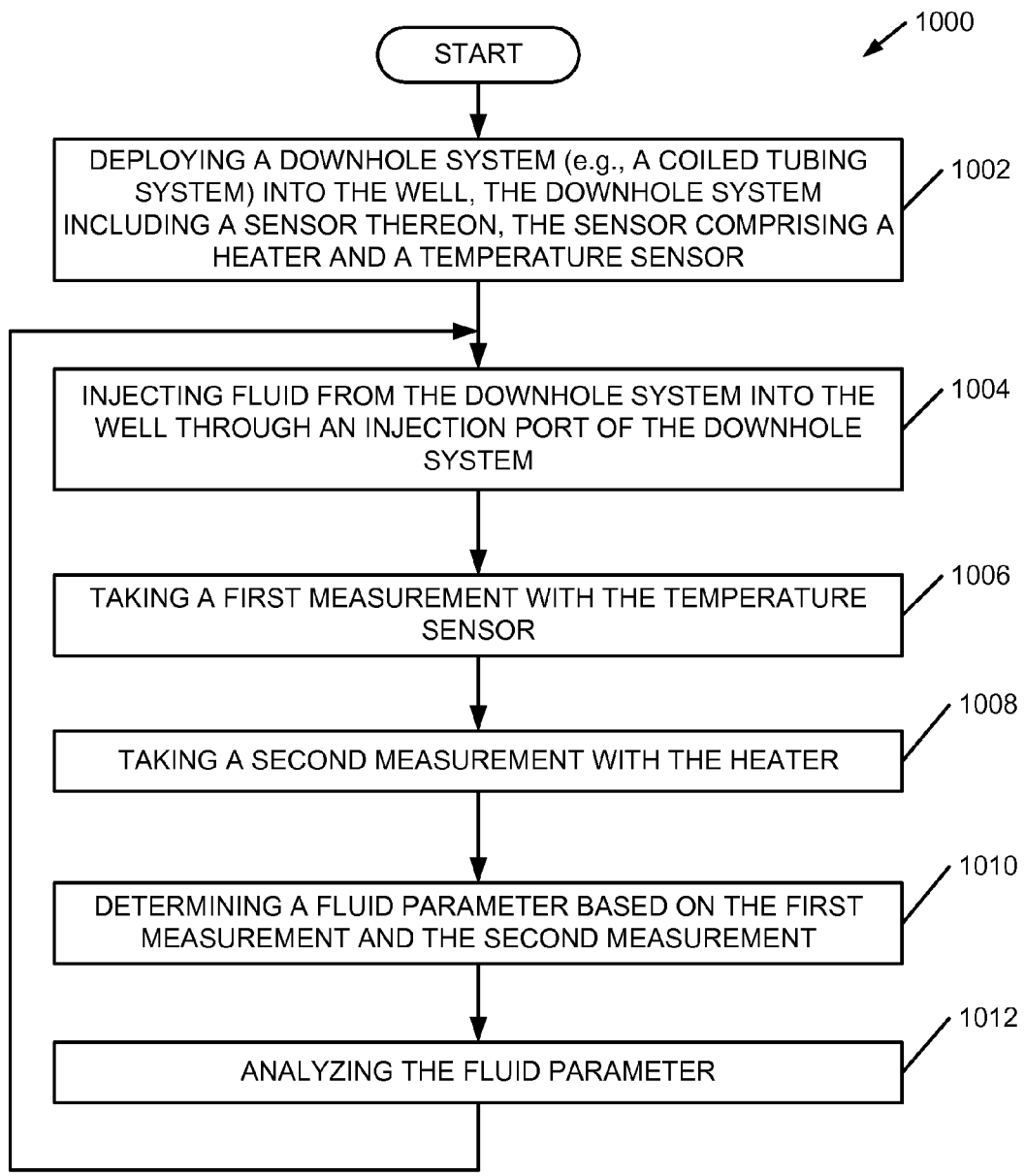
FIG. 10 illustrates example method(s) for determining fluid parameters in accordance with one or more embodiments.
Figure 11:
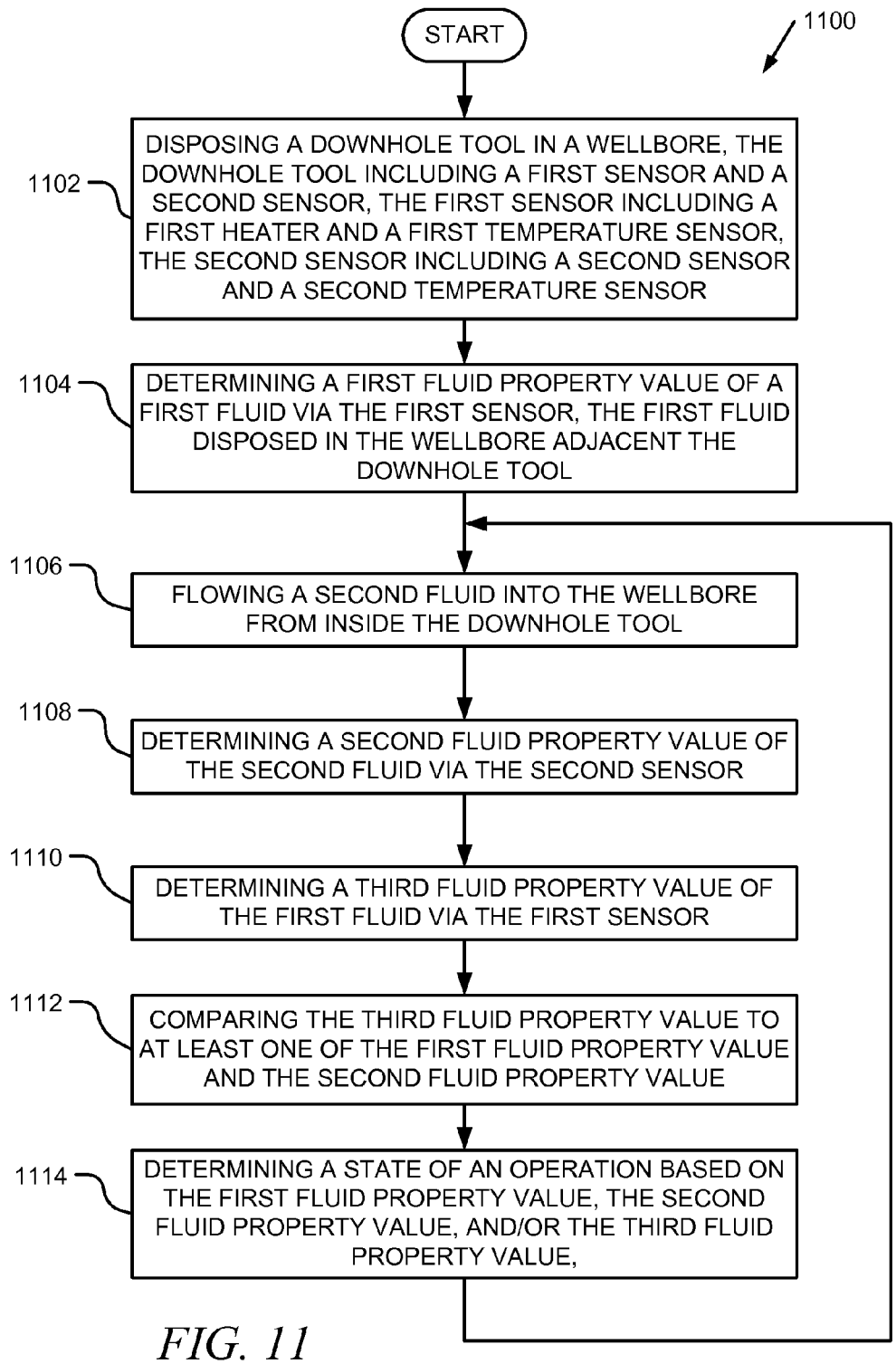
FIG. 11 illustrates example method(s) for determining fluid parameters in accordance with one or more embodiments.

FIGS. 10-11 are flowcharts representative of example methods disclosed herein. At least some of the example methods of FIGS. 10-11 may be carried out by a processor, the logging tool 128, the controller 436 and/or any other suitable processing device. In some examples, at least some of the example methods of FIGS. 10-11 are embodied in coded instructions stored on a tangible machine accessible or readable medium such as a flash memory, a ROM and/or random-access memory RAM associated with a processor. Some of the example methods of FIGS. 10-11 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, one or more of the operations depicted in FIGS. 10-11 may be implemented manually or as any combination of any of the foregoing techniques, for example, any combination of firmware, software, discrete logic and/or hardware.

Further, although the example methods are described in reference to the flowcharts illustrated in FIGS. 10-11, many other methods of implementing the example methods may be employed. For example, the order of execution of the blocks may be changed, and/or some of the blocks described may be changed, removed, sub-divided, or combined. Additionally, any of the example methods of FIGS. 10-11 may be carried out sequentially and/or carried out in parallel by, for example, separate processing threads, processors, devices, discrete logic, circuits, etc.

FIG. 10 illustrates an example method 1000 disclosed herein that may be used to determine one or more fluid parameters. At block 1002, a downhole system such as, for example, the coiled tubing system 100 of FIG. 1A is deployed into a well with a sensor (e.g., one of the example sensor elements 242a,b of FIG. 2A) thereon. In some examples, the sensor includes a heater (e.g., the example heater 454 of FIG. 4, the example RTD sensor 770 of FIG. 7) and a temperature sensor (e.g., the example temperature sensor 456 of FIG. 4, the example RTD sensor 770 of FIG. 7). At block 1004, fluid is injected from the downhole system into the well via an injection port (e.g., the example injection port 124 of FIG. 2) of the downhole system.

At block 1006, a first measurement (e.g., a temperature of the fluid) is taken with the temperature sensor. At block 1008, a second measurement (e.g., power dissipated via the heater, a temperature of the heater, etc.) is taken with the heater. At block 1010, a fluid parameter (e.g., a fluid velocity, a direction of fluid flow) is determined based on the first measurement and the second measurement. At block 1012, the fluid parameter is analyzed. In some examples, the measurements and/or the parameter are stored, processed, reported, and/or manipulated, etc.

FIG. 11 illustrates another example method 1100 disclosed herein, which may be used to determine a state of an operation. The example method 1100 of FIG. 11 begins by disposing a downhole tool (e.g., the coiled tubing system 102 of FIG. 1A) in a wellbore (block 1102). The downhole tool includes a first sensor (e.g., one of the example sensor elements 242a,b of FIGS. 2A, 8, and/or 9) and a second sensor (e.g., one of the example sensor elements 242a,b of FIGS. 2A, 8, and/or 9). The first sensor includes a first heater (e.g., the example heater 454 of FIG. 4, the example RTD sensor 770 of FIG. 7) and a first temperature sensor (e.g., the example temperature sensor 456 of FIG. 4, the example RTD sensor 770 of FIG. 7). In the illustrated example, the second sensor includes a second heater (e.g., the example heater 454 of FIG. 4, the example RTD sensor 770 of FIG. 7) and a second temperature sensor (e.g., the example temperature sensor 456 of FIG. 4, the example RTD sensor 770 of FIG. 7). In some examples, the first sensor is disposed on an outer surface of the downhole tool, and the second sensor is disposed inside the downhole tool. In other examples, the first sensor and/or the second sensor is employed without the downhole tool. Thus, the first sensor and/or the second sensor may be disposed in any suitable fluid flow passageways such as, for example, a first tube and a second tube, respectively, located at or near the surface of the Earth (e.g., in a laboratory).

At block 1104, a first fluid property value (e.g., thermal conductance, normalized power dissipation, density, temperature, etc.) of a first fluid (e.g., mud, water, gases, hydrocarbons, and/or any other fluid) is determined via the first sensor. The first fluid is disposed in the wellbore adjacent the downhole tool (i.e., outside of the downhole tool). At block 1106, a second fluid (e.g., mud, a chemical mixture, a treatment fluid, and/or any other suitable fluid) is flowed into the wellbore from inside the downhole tool. In some examples, the second fluid is flowed into the wellbore to perform the operation (e.g., to remove particulates from the wellbore, to cause a chemical reaction in the wellbore, etc.).

A second fluid property value (e.g., thermal conductance, normalized power dissipation, density, temperature, etc.) of the second fluid is determined via the second sensor (block 1108). In some examples, the second fluid property value is determined before the second fluid flows out of the downhole tool (i.e., while the second fluid is flowing inside the downhole tool). At block 1110, a third fluid property value of the first fluid is determined via the first sensor. In some examples, after the second fluid flows out of the downhole tool and into the wellbore, the first fluid includes, for example, the second fluid, bubbles, foam (e.g., froth, an aggregation of bubbles, etc.), particulates, etc., which may affect the third fluid property value. For example, when the sensor is used to determine the third fluid property value, the sensor may measure a characteristic (e.g., temperature, density, thermal properties, etc.) of one or more of the bubbles and/or the foam.

At block 1112, the third fluid property value is compared to at least one of the first fluid property value and the second fluid property value. Based on the first fluid property value, the second fluid property value, and/or the third fluid property value, a state of the operation is determined. For example, if the third fluid property value is different than the first fluid property value and/or the second fluid property value, a chemical reaction causing bubbles and/or foam to form in the wellbore may be occurring, particulates may be being carried to the surface, etc. If the third fluid property value is substantially the same as the first fluid property value and/or the second fluid property value, the chemical reaction may not have occurred, particulates may no longer be flowing toward the surface, etc. The above-noted states and operations are merely examples and, thus, the example methods and apparatus disclosed herein may be used to determine other states in conjunction with the above-noted operations and/or other operations.

Although the above-noted examples are discussed in conjunction with the example coiled tubing system 102 disposed in the well 104, example methods and apparatus disclosed herein may be employed at the surface and/or at any other suitable location. Thus, the sensing elements 242a,b may be used in conjunction with any suitable fluid flow passageway (e.g., a tube located in a laboratory, etc.) to determine a state of an operation.

Although only a few example embodiments have been described in detail above, those skilled in the art will readily appreciate that many modifications are possible in the example embodiments without materially departing from this disclosure. Accordingly, such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

The Abstract at the end of this disclosure is provided to comply with 37 C.F.R. §1.72(b) to allow the reader to quickly ascertain the nature of the technical disclosure. It is submitted with the understanding that it will not be used to interpret or limit the scope or meaning of the claims.

What is claimed is:

1. A method for performing an operation in a wellbore, comprising:
    disposing a downhole tool in a wellbore via a coiled tubing, the downhole tool including a treatment tool, a first sensor and a second sensor, the first sensor having a first heater and a first temperature sensor, the second sensor having a second heater and a second temperature sensor;
    performing the operation by flowing a treatment fluid into the wellbore from inside the coiled tubing and the downhole tool through the treatment tool;
    determining a first fluid property value of the treatment fluid via the first sensor when the treatment fluid is inside the downhole tool;
    determining a second fluid property value of the treatment fluid via the second sensor when the treatment fluid is in the wellbore outside of the downhole tool;
    determining a state of the operation based on a difference between the determined first fluid property value and the determined second fluid property value; and
    controlling the operation based on the determined state of the operation.

2. The method of claim 1 wherein flowing the first fluid into the wellbore comprises pumping mud through a portion of the downhole tool.

3. The method of claim 1 wherein determining the first fluid property value comprises determining a first density of the fluid and determining the second fluid property value comprises determining a second density of the fluid.

4. The method of claim 1 wherein determining the first fluid property value comprises determining a first thermal property value of the fluid and determining the second fluid property value comprises determining a second thermal property value of the fluid.

5. The method of claim 1 wherein flowing the fluid into the wellbore comprises flowing a chemical mixture into the wellbore to cause a chemical reaction in the wellbore.

6. The method of claim 5 wherein determining the second fluid property value comprises determining a characteristic of one of a bubble or foam in the fluid produced from the chemical reaction of the chemical mixture.

7. The method of claim 1 wherein the first and second sensors each comprise a calorimetric flow type sensor.

8. The method of claim 1 further comprising determining where the treatment fluid is flowing during the treatment.

9. The method of claim 1 further comprising retrieving the coiled tubing, downhole tool and treatment well after the operation is performed.

10. A method, comprising:
  disposing a downhole tool in a wellbore via a coiled tubing, the downhole tool including a treatment tool, a first sensor, and a second sensor, each of the sensors having a heater and a temperature sensor;
  determining a first fluid property value of a first fluid via the first sensor, the first fluid disposed in the wellbore adjacent the downhole tool;
  flowing a second fluid into the wellbore from inside the coiled tubing and the downhole tool through the treatment tool;
  determining a second fluid property value of the second fluid via the second sensor while flowing the second fluid into the wellbore;
  determining a third fluid property value of the first fluid when the second fluid is inside the downhole tool via the second sensor;
  determining a state of a downhole operation based a difference between at least one of the first fluid property value, the second fluid property value, and the third fluid property value; and
  controlling the downhole operation based on the determined state of the operation.

11. The method of claim 10 wherein determining the first fluid property value comprises determining a first density of the first fluid and wherein determining the second fluid property value comprises determining a second density of the first fluid.

12. The method of claim 10 wherein determining the first fluid property value comprises determining a first thermal property value of the first fluid and wherein determining the second fluid property value comprises determining a second thermal property value of the first fluid.

13. The method of claim 10 wherein flowing the second fluid into the wellbore comprises pumping mud through a portion of the downhole tool.

14. The method of claim 10 wherein flowing the second fluid into the wellbore comprises flowing a chemical mixture into the wellbore to cause a chemical reaction in the wellbore.

15. The method of claim 10 further comprising monitoring the flow of the second fluid in real-time.

16. The method of claim 10 wherein the first and second sensors each comprise a calorimetric flow type sensor.

* * * * *